(12) United States Patent
Koike (10) Patent No.: US 6,413,179 B1
(45) Date of Patent: Jul. 2, 2002

(54) AUTOTENSIONER AND BELT TENSION ADJUSTER

(75) Inventor: Takashi Koike, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/643,881

(22) Filed: Aug. 23, 2000

(30) Foreign Application Priority Data

Aug. 30, 1999 (JP) ............................................ 11-243092
Feb. 21, 2000 (JP) ....................................... 2000-042729

(51) Int. Cl.⁷ ................................................. F16H 7/08
(52) U.S. Cl. ......................................... 474/109; 92/5 R
(58) Field of Search ............................... 474/102, 105, 474/109, 106, 110; 92/5 R; 91/1

(56) References Cited

U.S. PATENT DOCUMENTS 4,207,565 A  *  6/1980  Isakson et al. .............. 340/626
4,736,674 A  *  4/1988  Stoll ............................ 92/5 R
5,653,651 A  *  8/1997  Kawashima et al. ........ 474/110

FOREIGN PATENT DOCUMENTS

JP  3-13647  3/1991
JP  7-117130  12/1995

* cited by examiner

*Primary Examiner*—David A. Bucci
*Assistant Examiner*—Timothy McAnulty
(74) *Attorney, Agent, or Firm*—Wenderoth, Lind & Ponack, L.L.P.

(57) ABSTRACT

An autotensioner and a tension adjustor are provided with a detector for detecting the timing for belt replacement. The bottom end of a metal ring of an oil seal for closing a top opening of a cylinder is exposed. A guide flange slidable along the inner surface of the cylinder is mounted on a pushrod. Due to contact of the guide flange with the metal ring, the limit position of the forward stroke of the pushrod is detected and the belt replacement timing is notified.

1 Claim, 15 Drawing Sheets

AUTOTENSIONER AND BELT TENSION ADJUSTER

BACKGROUND OF THE INVENTION

This invention relates to an autotensioner for keeping the tension in a belt such as a camshaft-driving belt in a vehicle engine at a constant level, and a belt tension adjustor using such an autotensioner.

Figure 16:
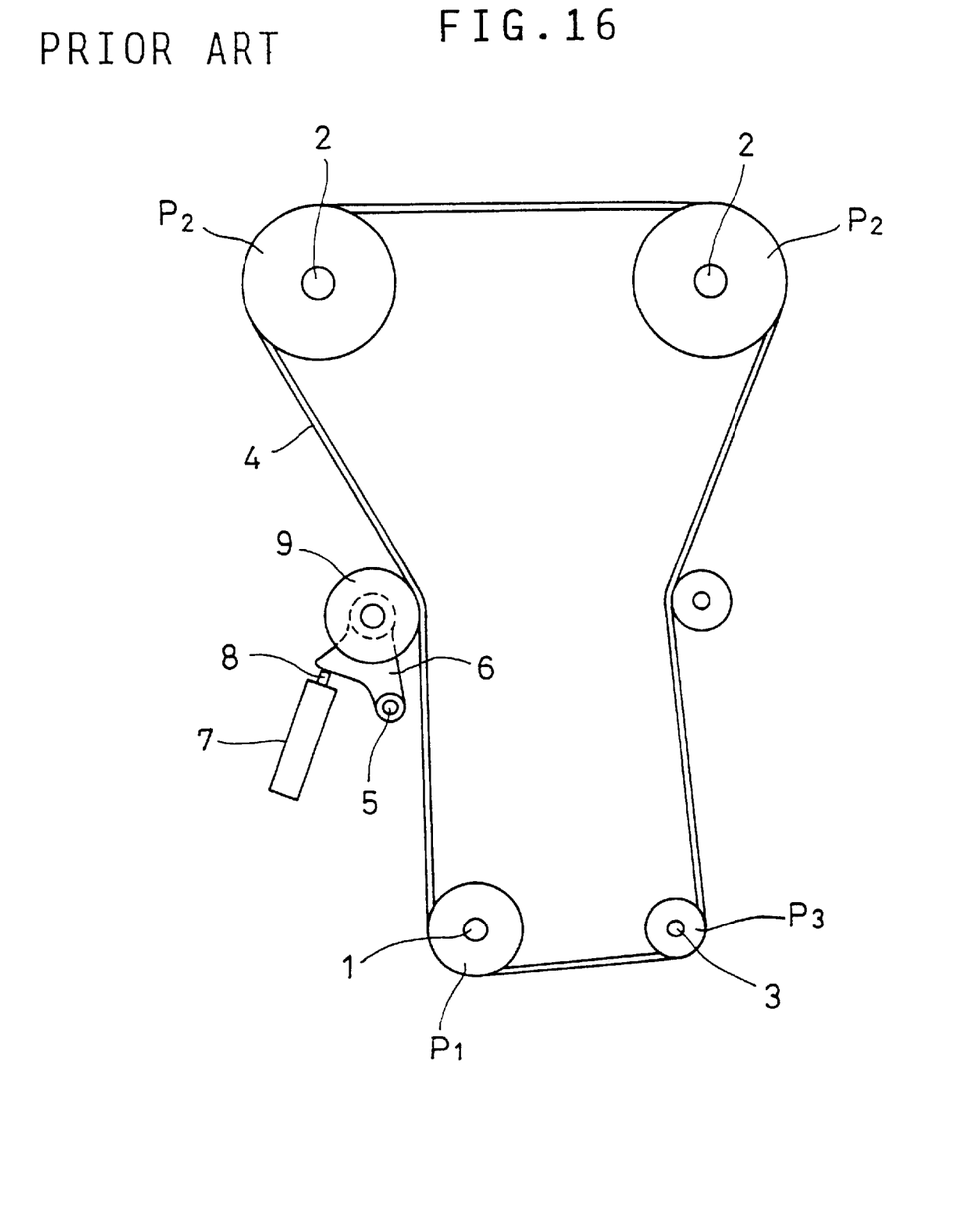
FIG. 16 is a front view of a conventional belt transmission system for driving a camshaft.

FIG. 16 shows a belt transmission system in an internal combustion engine for driving engine camshafts. It comprises a pulley P1 mounted on an engine crankshaft 1, pulleys P2 mounted on camshafts 2, a pulley P3 mounted on an oil pump drive shaft 3, and a timing belt 4 trained around these pulleys to transmit the rotation of the crankshaft 1 to the camshafts 2 and the drive shaft 3.

The belt 4 tends to stretch with time due to aging and the distances between the pulleys change due to thermal expansion of the engine during operation. The tension in the timing belt 4 thus changes. In order to absorb such change in the belt tension, a tension adjustor is used. The tension adjustor of FIG. 16 comprises a pulley arm 6 pivotable about a shaft 5 and carrying a tension pulley 9, and an autotensioner 7 including an outwardly biased pushrod 8 to press the pulley 9 against the belt 4. As the tension in the belt increases or decreases, the pushrod 8 is pushed into or protrudes from the cylinder of the autotensioner 7 to absorb any change in the belt tension and keep the tension constant Such autotensioners are disclosed e.g. in Japanese patent 1891868 and Japanese patent publication 7-117130.

As the timing belt stretches gradually due to aging, the pushrod 8 protrudes from the cylinder to absorb any change in the belt tension.

For a belt transmission system having no such autotensioner 7, it is recommended to replace the timing belt 4 when the vehicle has traveled 100 thousand kilometers. But by using an autotensioner, it is possible to make the belt tension stable and prevent flapping of the belt and thus to increase its durability. This makes it possible to prolong the guarantee period of the timing belt even until the odometer reading far exceeds 100 thousand kilometers.

But the stroke of the pushrod 8 is limited. When the pushrod advances to a position exceeding its effective stroke, the autotensioner will lose its tension adjusting capability, i.e. the ability to keep constant the tension in the belt. Thus, the belt becomes slack and begins to flap. This increases the possibility of "jump of pulley teeth" and decreases the durability of the belt. In the worst case, the belt may be damaged.

An object of the invention is therefore to provide an autotensioner and a tension adjustor having a means for detecting the belt replacement timing.

SUMMARY OF THE INVENTION

According to the invention, there is provided an autotensioner comprising a cylinder, a pushrod slidably received in the cylinder, and a spring for biasing the pushrod so as to protrude out of the cylinder, the pushrod being movable in an axial direction to absorb any change in the tension in a belt, characterised in that a detector for detecting a limit position of a forward stroke of the pushrod is provided.

With this arrangement, when the belt has stretched with time due to aging, the pushrod moves outwardly. The detector means detects the fact that the pushrod has moved to the limit position. The signal from the detector informs that the autotensioner is malfunctioning and that the time to replace the belt has come.

The detector means may comprise an electrode mounted to the cylinder through an insulating member, and a contactor provided on the pushrod so as to come into contact with the electrode when the pushrod has moved to the limit position.

In the abovesaid arrangement, the electrode may be a metal ring for reinforcing an oil seal closing an opening of the cylinder, and the contactor may be a guide flange fixedly mounted on the pushrod and guided along the inner periphery of the cylinder so as to contact the exposed portion of the metal ring to detect the limit position.

The pushrod may be formed with a small-diameter portion at its upper portion and the contactor may be a shoulder formed at the root of the small-diameter portion, or a pin mounted on the pushrod near its tip to extend radially outwardly. The electrode is provided at such a position that the shoulder comes into contact with the electrode when the pushrod has moved to the limit position.

The detector means may comprise a detecting coil mounted on the inner wall of the cylinder so as to be coaxial with the pushrod, a detection piece provided on the pushrod near its tip and having a different magnetic permeability from the pushrod, the detection piece having a bottom edge defining a boundary between the piece and the pushrod, the bottom edge being located so as to oppose the coil when the pushrod has moved to the limit position, whereby the limit position is detected based on a change in output of the detecting coil.

The detector means may comprise a ring-shaped permanent magnet integral with the pushrod, and a sensor mounted on the outer surface of the cylinder for detecting the magnetic force produced from the permanent magnet, the permanent magnet being located so as to oppose the sensor when the pushrod has moved to the limit position.

The detector means may comprise an additional sensor for detecting the magnetic force produced from the permanent magnet, the additional sensor being mounted at such a position that the permanent magnet opposes the additional sensor before the pushrod moves to the limit position.

As the sensor for detecting the limit position of the pushrod, a Hall sensor with an analog output may be used. Since the analog output from the Hall sensor changes with the movement of the pushrod and thus the permanent magnet, the position of the pushrod can be detected continuously by converting the analog signal from the Hall sensor to a digital signal by means of an A/D converter and giving the digital signal to a CPU of the control unit for computation.

In detecting the position of the pushrod, the magnetic force of the permanent magnet decreases as the temperature increases whereas the Hall sensor has an output offset with temperature change. Thus some error can occur in the detection of the position of the pushrod with temperature change.

The detector means may further comprise a temperature sensor and a temperature compensation unit for correcting the output of the sensor based on the output from the temperature sensor.

The temperature sensor may be provided near the sensor.

The temperature sensor may be one originally provided in a vehicle on which is mounted the autotensioner.

According to this invention, there is also provided a belt tension adjustor comprising a pivotable pulley arm carrying a tension pulley for tensioning a belt, and an autotensioner comprising a cylinder and a pushrod structured to be biased toward the pulley arm to pivot the pulley arm in such a direction that the tension pulley is pressed against the belt, characterized in that a switch is provided at such a position that when the pushrod has moved to a limit position of its forward stroke, the pulley arm abuts and activates the switch.

In the belt tension adjustor, when the pushrod moves outwardly until it reaches the limit position, the pulley arm will actuate the detection switch, thus notifying that the autotensioner is malfunctioning.

Other features and objects of the present invention will become apparent from the following description made with reference to the accompanying drawings, in which:

DETAILED DESCRIPTION OF THE PREFERRED EMBODIMENT

Figure 1:
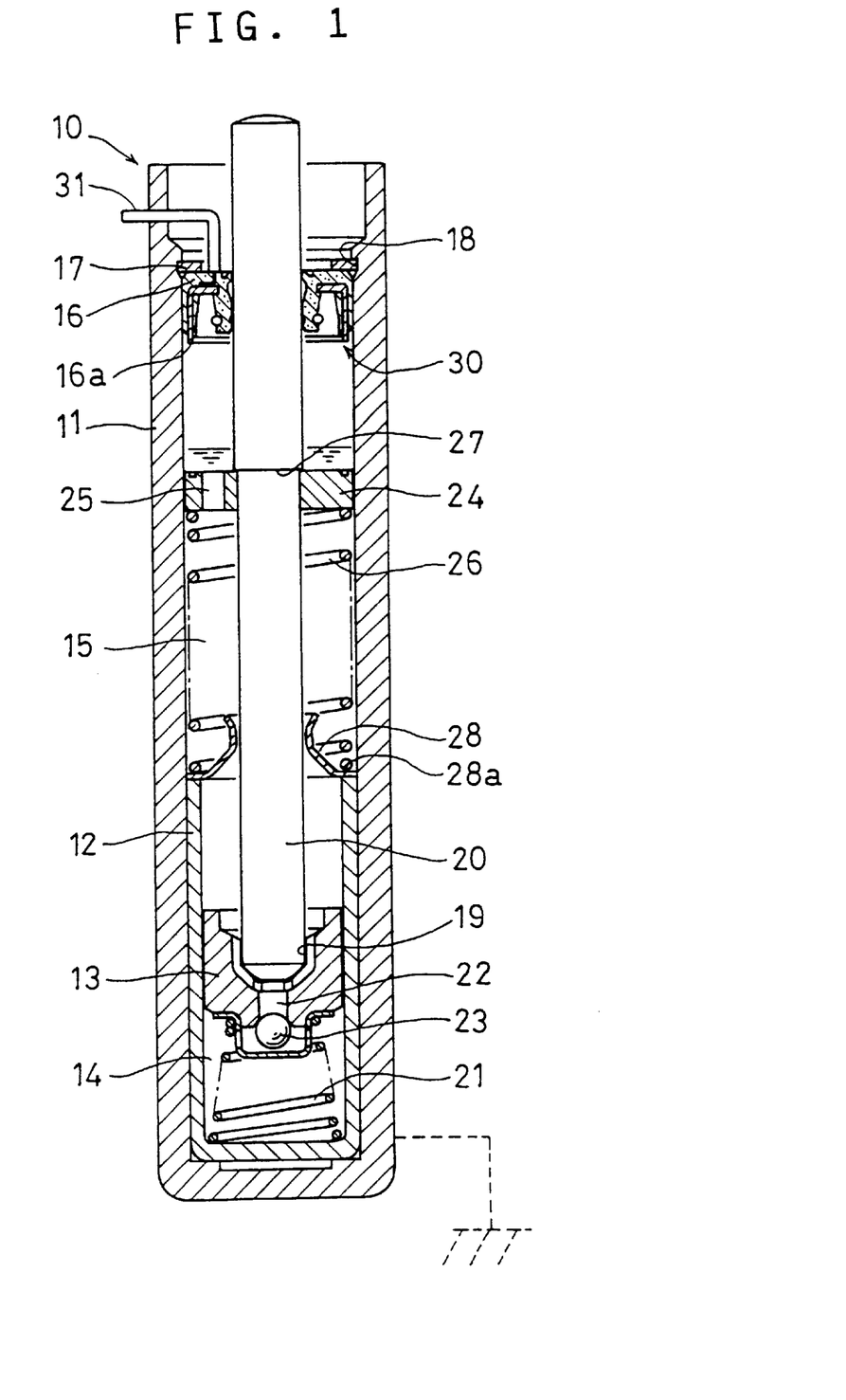
FIGS. 1 and 3 are front views in vertical section of an autotensioner of a first embodiment of the invention.

FIG. 1 shows a hydraulic autotensioner 10 embodying the invention. This autotensioner is used in the same manner as the conventional autotensioner 7 shown in FIG. 16 to give a pushing force to the pulley arm 6.

The autotensioner 10 has a closed-bottomed, open-topped cylinder 11 having a sleeve 12 fixed to the lower portion of its inner wall. A piston 13 is slidably mounted in the sleeve 12.

The cylinder 11 is partitioned by the piston 13 into a lower pressure chamber 14 and an upper reservoir 15. The latter has an open top closed by an oil seal 16 retained in position by a snap ring 17 engaged in an annular groove 18 formed in the inner wall of the cylinder 11 near its top opening.

The cylinder 11 is filled with a hydraulic oil such as silicone oil and an air layer is present between the oil and the oil seal 16.

A pushrod 20 slidably extends through a hole formed in the oil seal 16 and has its bottom end received in a recess 19 formed in the top of the piston 13. Its top end is disposed above the cylinder 11.

A spring 21 mounted in the pressure chamber 14 biases the piston 13 upwardly to prevent it from separating from the pushrod 20. The piston 13 is formed with a passage 22 through which the pressure chamber 14 and the reservoir 15 communicate with each other. A check valve 23 closes and opens the passage 22. The check valve 23 is adapted to open the passage 22 when the pressure in the pressure chamber 14 is lower than the pressure in the reservoir 15 and to close it when the former is higher than the latter.

A guide flange 24 is fitted on the pushrod 20 with its outer surface in slide contact with the inner wall of the cylinder 11. It is formed with a through hole 25. A pressure-adjusting spring 26 is mounted around the pushrod 20 between the flange 24 and the top of the sleeve 12 to bias the flange upwardly to keep it pressed against a shoulder 27 of the pushrod 20. The pushrod is thus biased upwardly by the spring 26.

In the reservoir 15, a separator 28 is mounted around the pushrod 20 with its bottom flange 28a pressed by the lower end of the spring 26 against the sleeve 12 so as not to be axially movable.

The separator 28 is in the shape of an upwardly tapering truncated cone such that a narrow gap is defined between the top small-diameter end of the separator 28 and the pushrod 20. The separator serves to prevent any bubbles present in the oil in the reservoir 15 from entering the pressure chamber 14. For this purpose, it has to be sufficiently high but short so as not to protrude from the oil surface.

The hydraulic autotensioner of the abovesaid structure is mounted on the belt transmission system as shown in FIG. 16. When the tension in the belt 4 increases and the downward pressure on the pushrod 20 and the piston 13 from the belt increases above the force of the pressure-adjusting spring 26, oil in the pressure chamber begins to leak through a narrow gap formed between the sleeve 12 and the piston 13 into the reservoir 15. The volume of the pressure chamber 14 thus decreases gradually, so that the pushrod 20 and the piston 13 will lower slowly.

When the timing belt 4 slackens, the pushrod 20 is pushed up by the spring 26 while the piston 13 is pushed up by the spring 21. The moment the piston 13 begins to move upwardly, the pressure in the pressure chamber 14 drops sharply, so that the check valve 23 opens the passage 22 instantly. Thus, as the pushrod 20 and piston 13 are pushed up, oil in the reservoir 15 can smoothly flow into the pressure chamber 14. The pushrod 20 can thus quickly protrude to absorb any slack of the belt.

The timing belt 4 tends to stretch with time due to aging. As the belt stretches, the pushrod 20 protrudes gradually outwardly with time to absorb the stretching of the belt.

Although the stroke of the pushrod 20 of the autotensioner 10 is determined taking these factors into consideration, with increased travel distance of the car between maintenances of the belt or due to abnormal stretching of the belt, the pushrod 20 may protrude beyond its stroke limit.

The stroke limit of the pushrod 20 is at a point where the guide flange 24 abuts the oil seal 16 because once the flange 24 abuts the oil seal, the spring 26 cannot push the pushrod 20 outwardly any further. Now it is not possible to keep the belt tension constant any more.

The autotensioner of the invention has a means 30 for detecting the stroke limit of the pushrod 20.

The detector means 30 is described below. The autotensioner 10 is mounted on an engine block (not shown). The cylinder 11 is made from an aluminum alloy and the guide flange 24, which is in slide contact with the cylinder 11, is made from a conductive material such as iron. Thus, the flange 24 is at the same potential as the ground.

Figure 2:
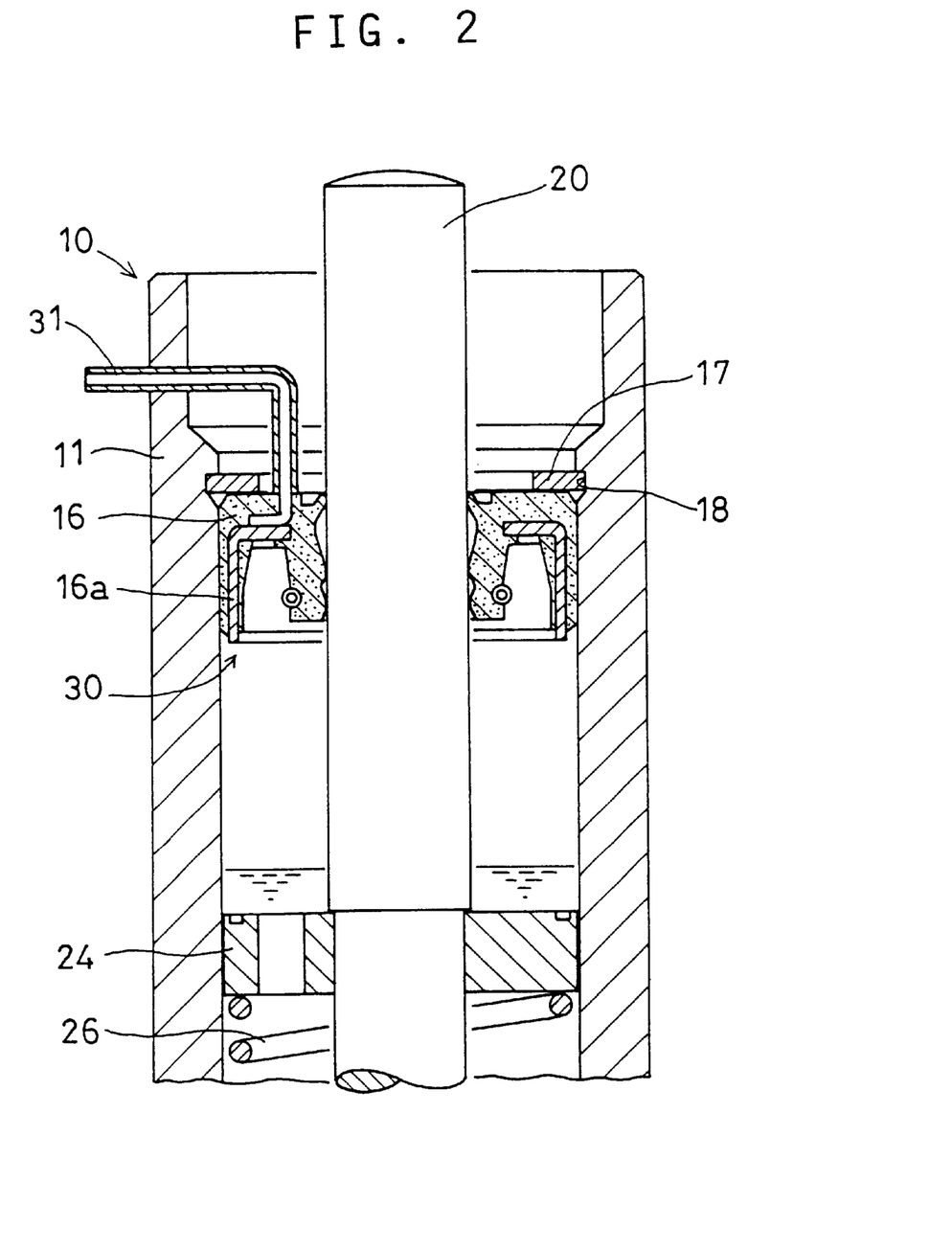
FIG. 2 is an enlarged sectional view of the autotensioner of FIG. 1.

As shown in FIG. 2, an electrode ring 16a made from a conductive metal is buried in the oil seal 16 to reinforce the oil seal. The ring 16a has its bottom end protruding from the bottom end of the seal 16 and is connected to a power source through a wire 31.

Figure 3:
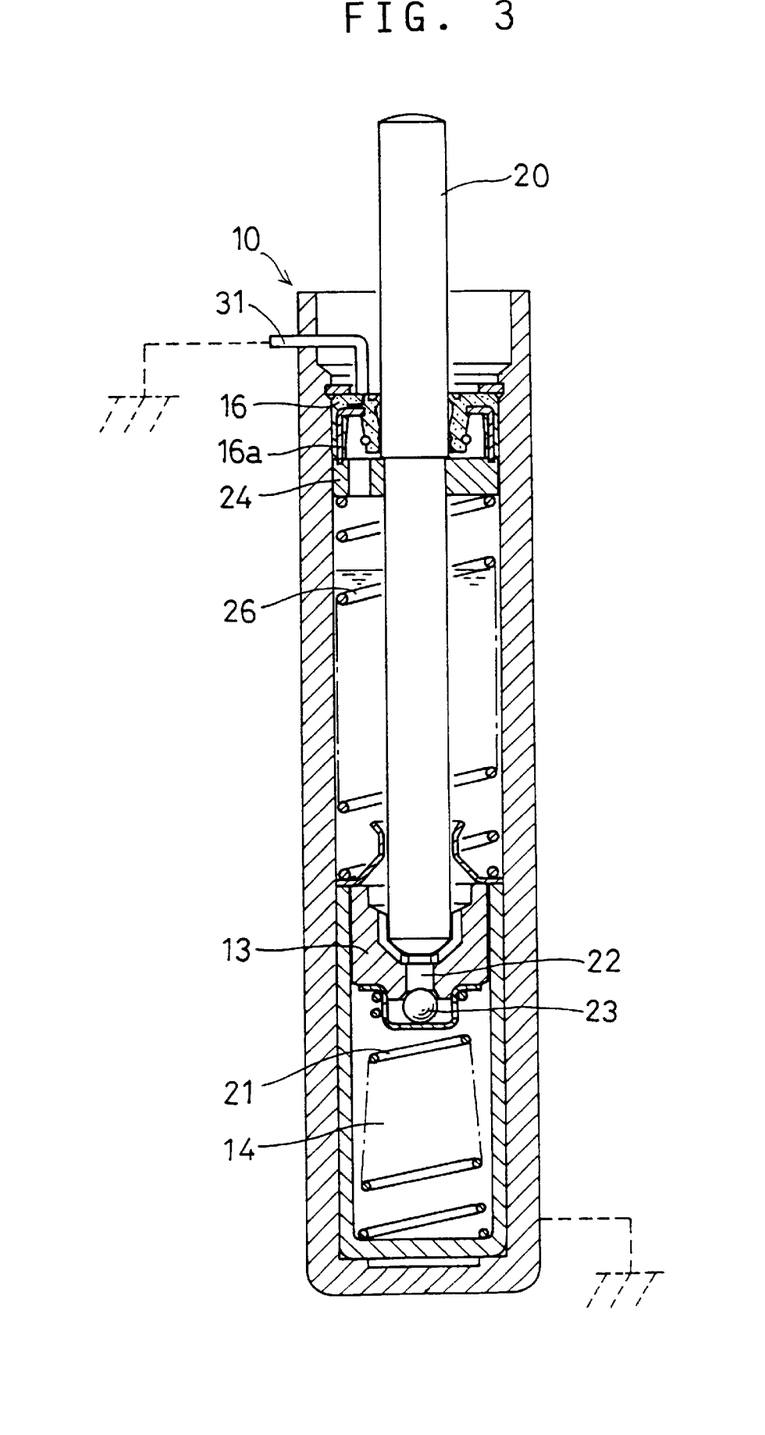
Figure 4:
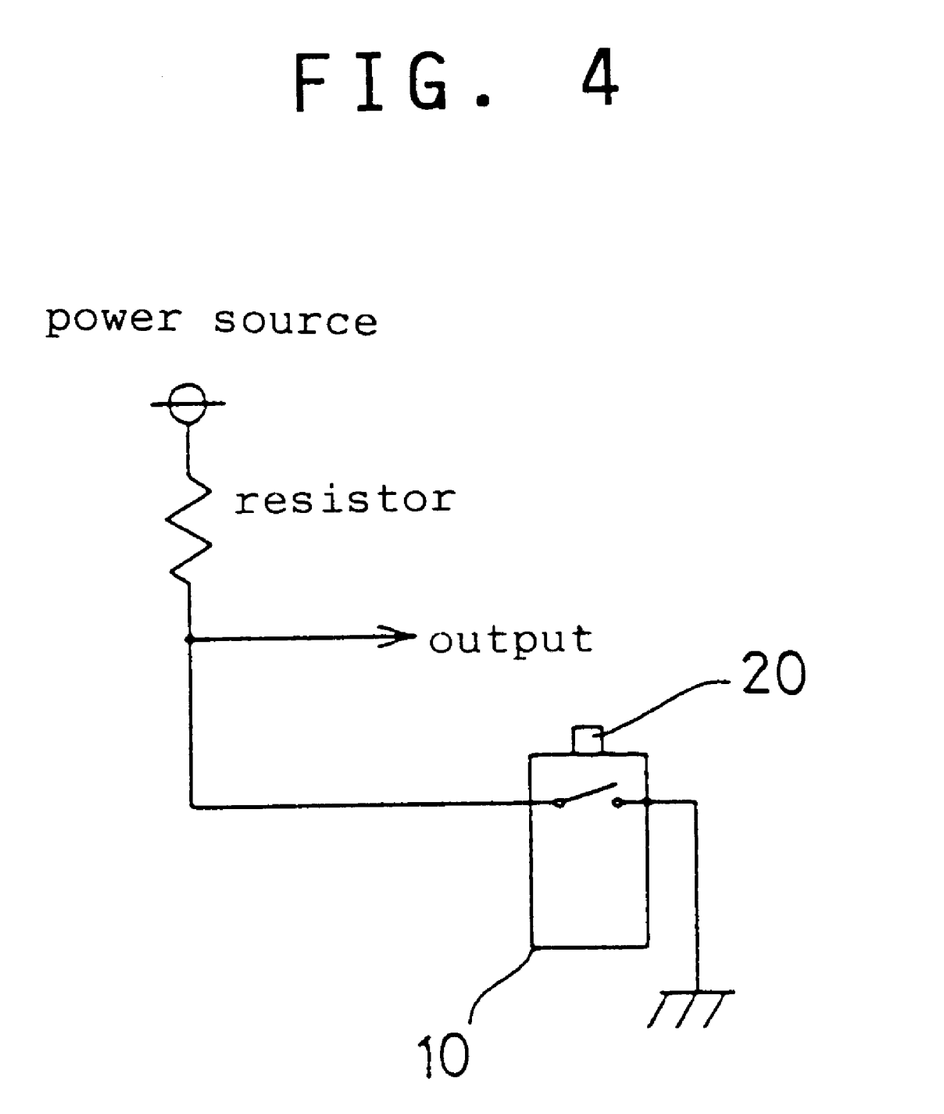
FIG. 4 is a diagram showing the circuit for detecting the stroke limit of the pushrod of the autotensioner of FIG. 1.

When the pushrod 20 rises to its stroke limit, the flange 24 comes into contact with the bottom end of the ring 16a as shown in FIG. 3, so that the potential of the ring 16 drops to the same level as the ground potential. In other words, the ring 16a and the flange 24 form a contact switch of such a circuit as shown schematically in FIG. 4.

The wire 31 is connected to an engine control unit (not shown) through a connector. The control unit detects the fact that the pushrod 20 has moved to its stroke limit based on change in potential of the ring 16a and notifies the driver of this fact e.g. by turning on a lamp. The driver thus knows that the autotensioner 10 is malfunctioning and that he has to replace the timing belt with a new one.

Figure 5:
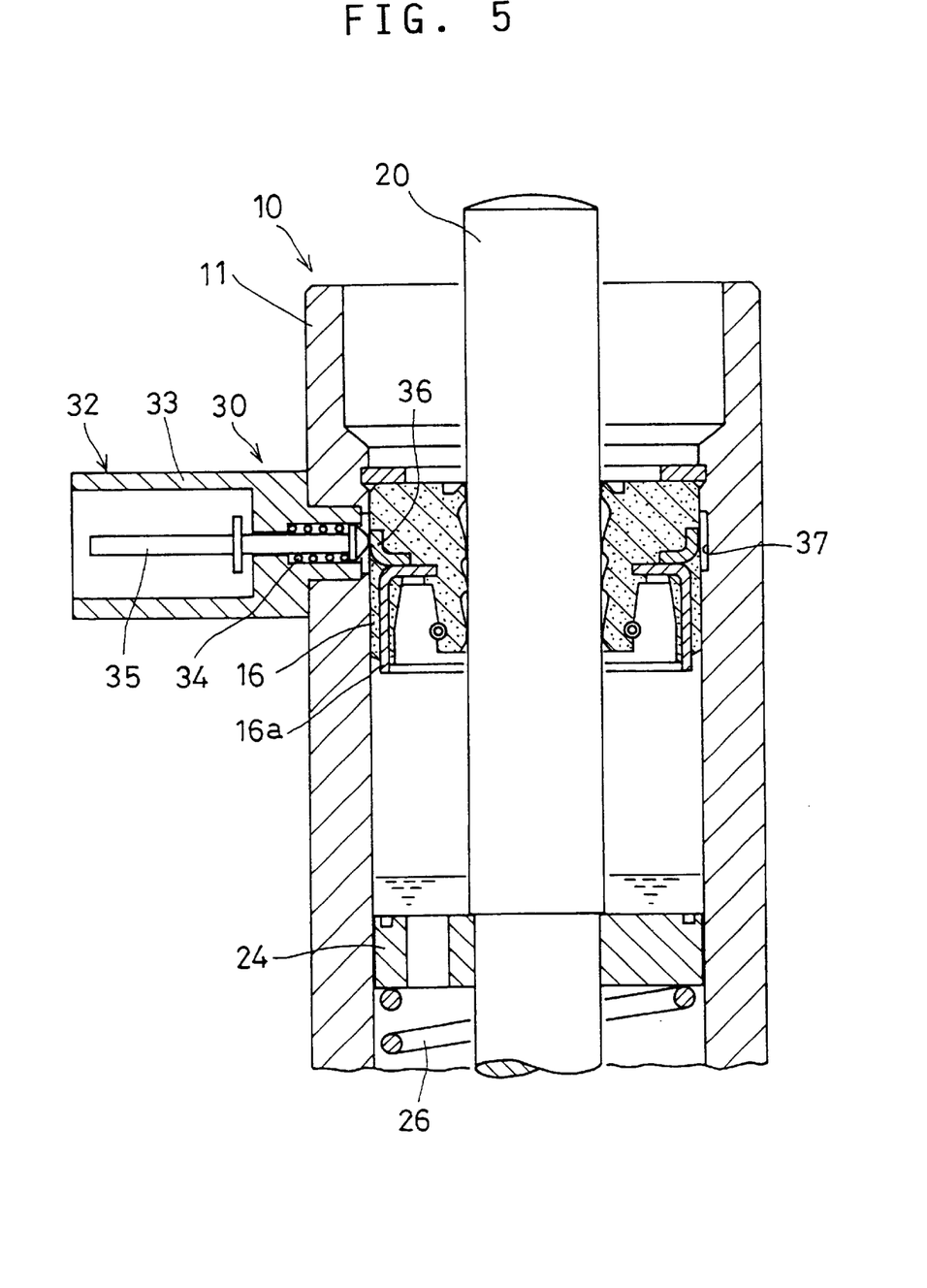
FIGS. 5, 6A and 6B, 7 and 8 are sectional views of autotensioners of second to fifth embodiments, respectively.

In the embodiment of FIG. 5, a connector 32 is used instead of the wire 31. It comprises a housing 33 made from an insulating material such as a synthetic resin and fixed to the cylinder 11, and a metal connector pin 35 slidably supported in the housing 33. A spring 34 is mounted around the pin 35 to press the pin against an auxiliary ring 36 embedded in the oil seal 16 and welded to the ring 16a. The ring 36 is kept out of contact with the cylinder 11 by a groove 37 formed in the inner wall of the cylinder.

The pin 35 may be connected to the ring 36 not by contact but by piercing the former into the latter.

The connector pin 35 thus produces a signal indicating that the pushrod 20 has moved to its stroke limit when the flange 24 abuts the ring 16a.

Figure 6A:
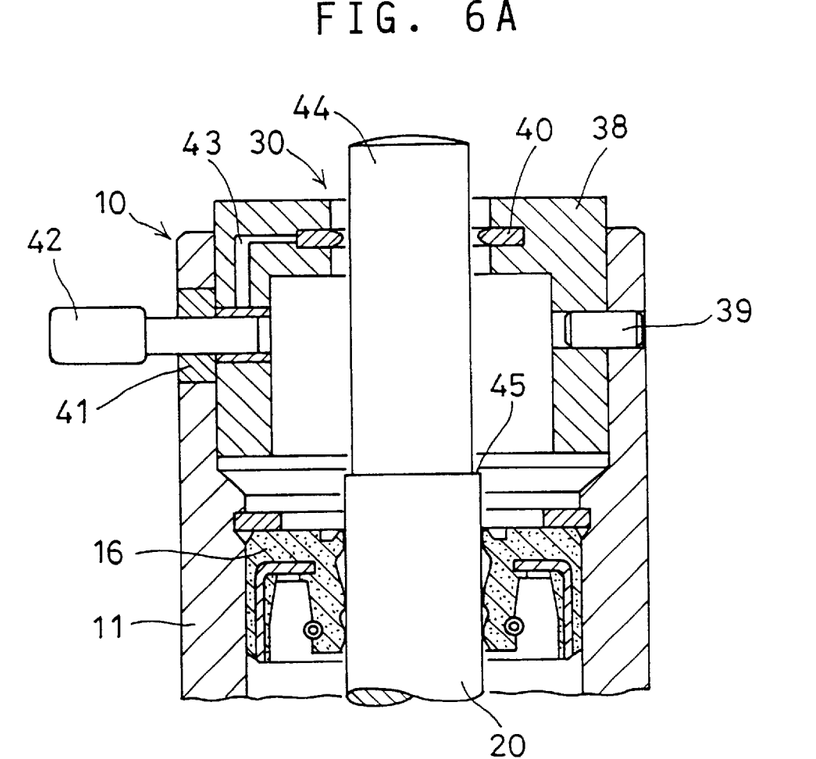

The detector 30 of FIG. 6A has a cap-shaped electrode holder 38 of a synthetic resin inserted in the cylinder 11 through its top opening and secured to the cylinder by pins 39. The holder 38 supports a ring-shaped electrode 40 mounted coaxially with the pushrod 20. A connector pin 42 is fastened to the cylinder 11 through an insulating member 41 and connected to the electrode 40 through a conductor 43.

Figure 6B:
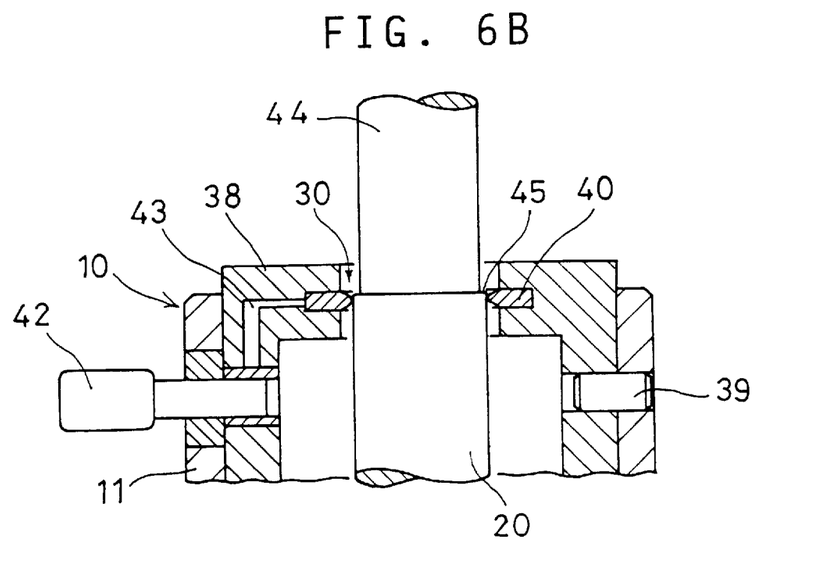
Figure 7:
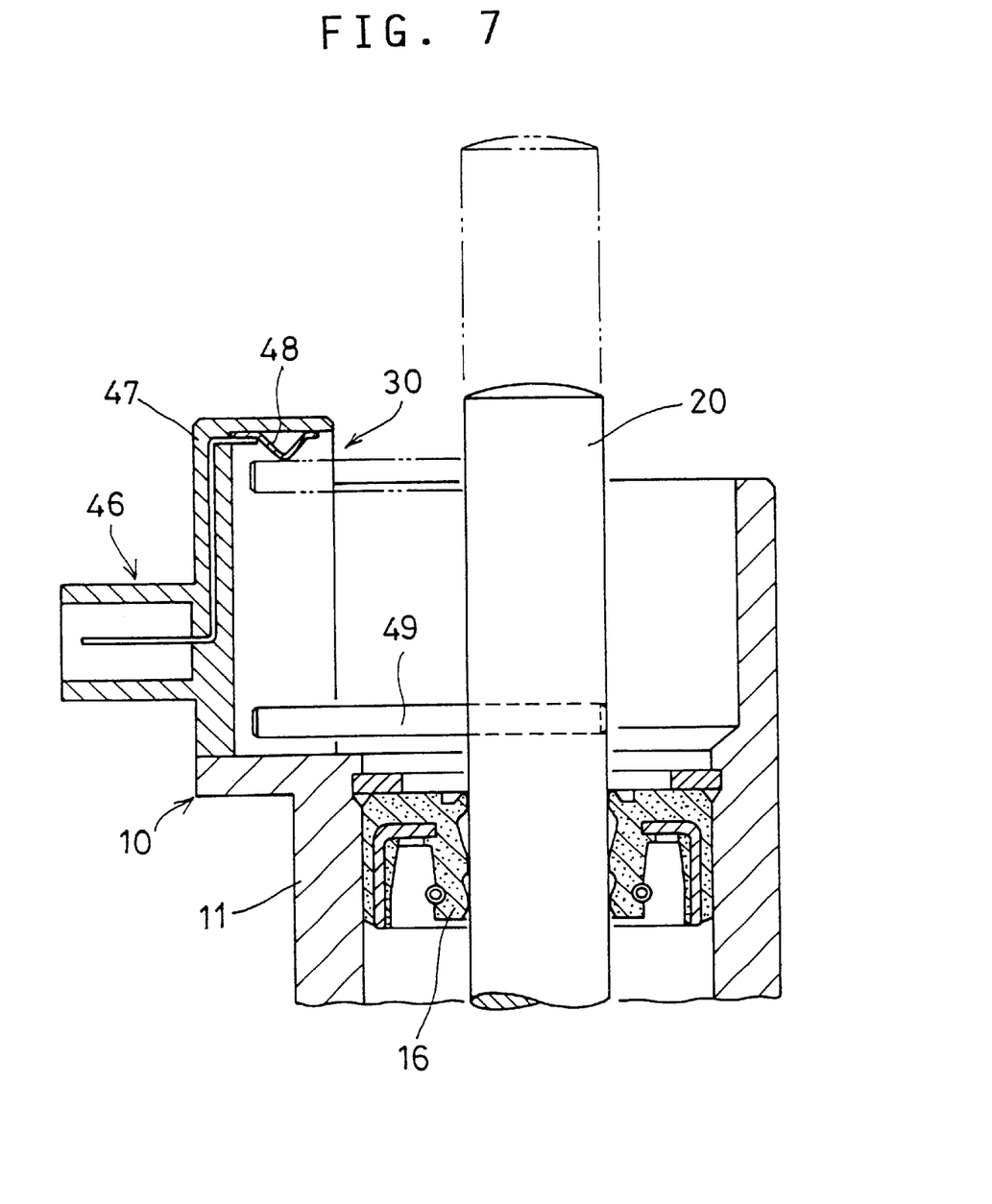

The pushrod 20 is formed with a small-diameter portion 44 at its top end such that a shoulder 45 is defined at the lower end of the small diameter portion 44. The shoulder 45 is provided at such a position that the electrode 40 abuts the shoulder when the pushrod 20 has moved to its stroke limit, as shown in FIG. 6B. In this state, a signal is produced indicating that the pushrod has moved to its stroke limit The detector 30 of FIG. 7 includes a connector 46 comprising a housing 47 of a synthetic resin provided on top of the cylinder 11, and an electrode 48 made integral with the housing 47 when the housing is molded. A pin 49 protrudes radially outwardly from an upper portion of the pushrod 20 so as to abut the electrode 48 when the pushrod has moved to its stroke limit.

Figure 8A:
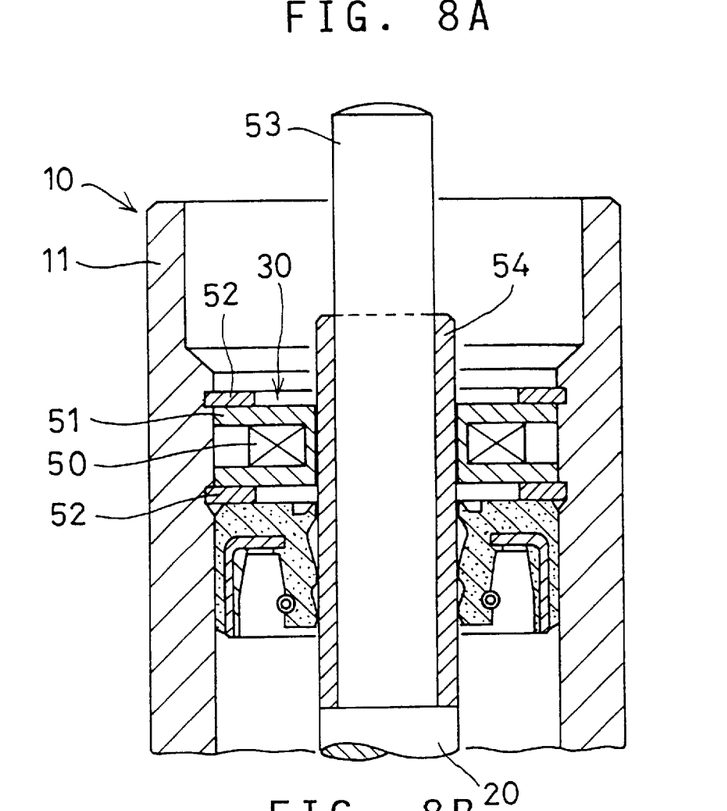

The detector of FIG. 8A includes a coil 50 wound around a ring-shaped core 51 which is inserted in the cylinder 11 near its top opening. Two snap rings 52 mounted in the cylinder 11 prevent axial movement of the core 51.

The pushrod 20 is formed with a small-diameter portion 53 at its top onto which is pressed a sleeve 54 which is made from a material having a different magnetic permeability from the material forming the pushrod 20. For example, it is made from an aluminum material if the pushrod 20 is of a ferrous material.

Figure 8B:
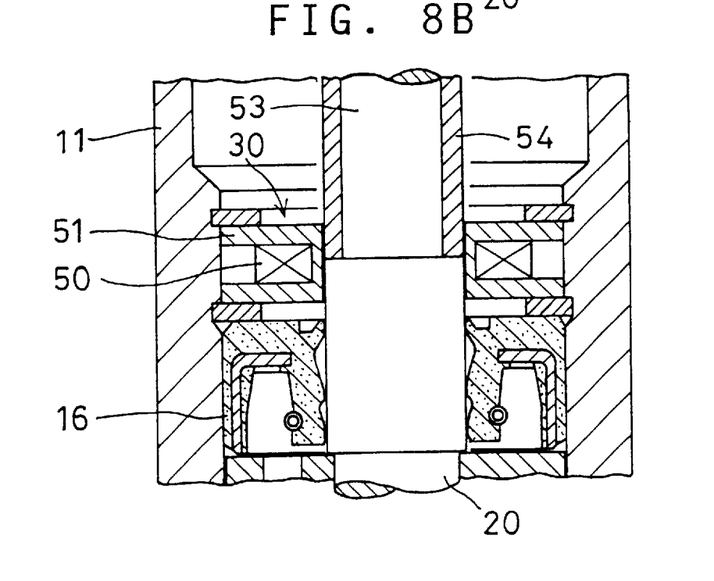
Figure 9A:
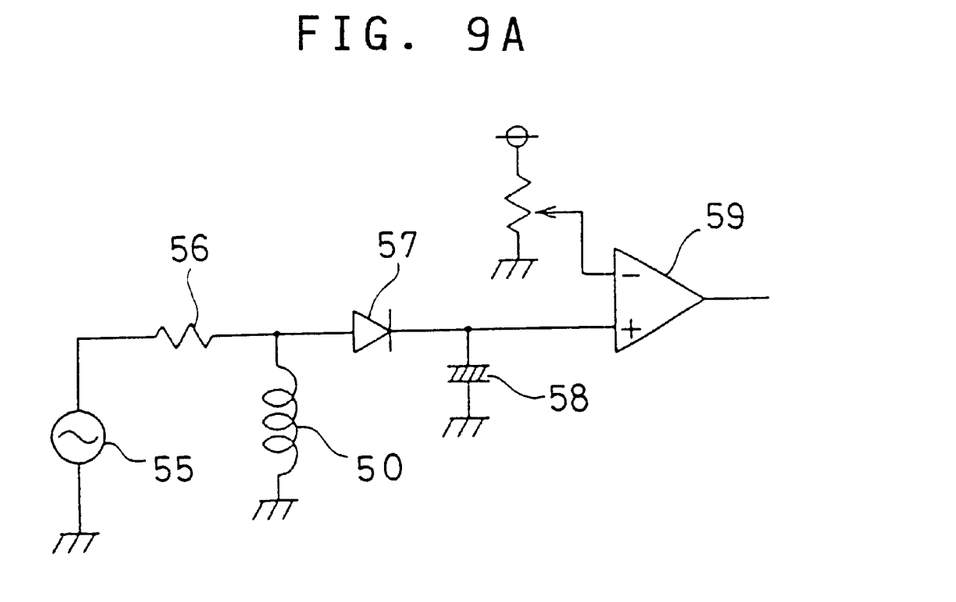
FIG. 9A schematically shows an example of a stroke limit detecting circuit of the embodiment of FIG. 8.

The sleeve 54 is mounted on the pushrod 20 such that its bottom edge will oppose the coil 50 when the pushrod 20 has moved to its stroke limit, as shown in FIG. 8B. In this state, since the sleeve 54 and the pushrod 20 have different magnetic permeabilities, the output of the coil 50 changes. Based on the change in output of the coil 50, it is possible to detect that the pushrod has moved to its stroke limit, using a circuit as shown in FIG. 9A.

Figure 9B:
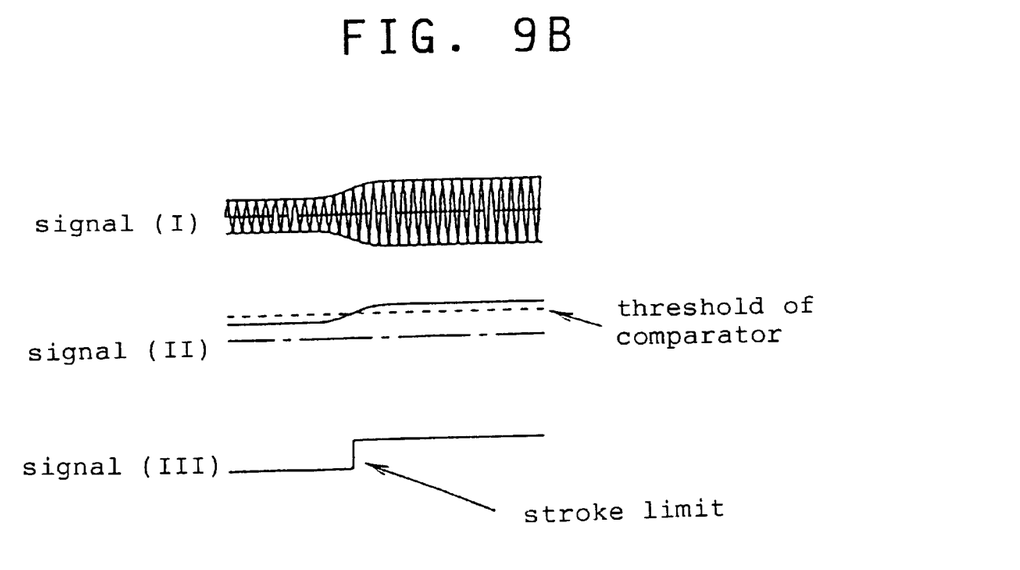
FIG. 9B shows examples of signals produced by the circuit of FIG. 9.

In this arrangement, one end of the coil 50 is connected to a signal circuit including an oscillator 55 of several tens of kilohertz and a resistor 56. The AC signal (I) from the coil 50 is rectified and smoothed by a diode 57 and a capacitor 58 into signal (II). The signal (II) is entered into a comparator 59 in which the point at which the amplitude has changed due to a change in inductance is detected by comparison with a threshold, and signal (III) which indicates the stroke limit is produced.

Figure 10A:
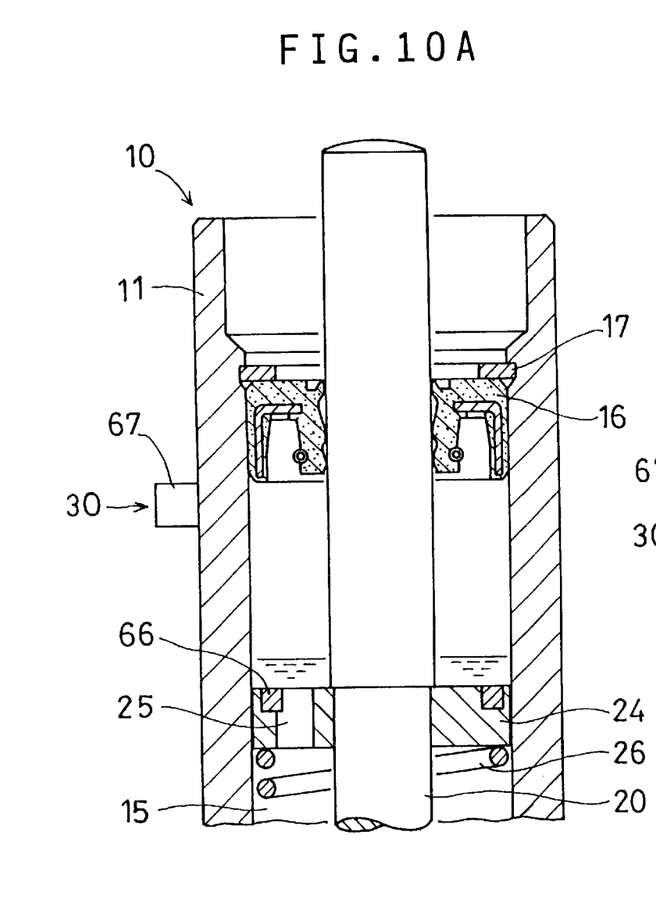
FIGS. 10A and 10B and 11 are sectional views of autotensioners of sixth and seventh embodiments, respectively.
Figure 10B:
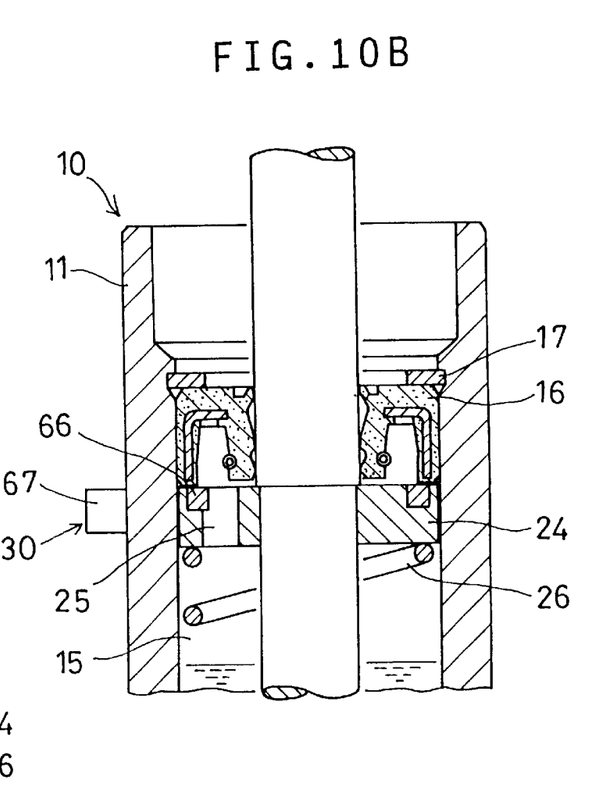

The detector 30 of FIG. 10A comprises a ring-shaped permanent magnet 66 bonded to the guide flange 24, which is made from a non-magnetizable material in this embodiment, and a sensor 67 fixedly mounted on the outer surface of the cylinder 11 at such a position that it radially opposes the magnet 66 when the pushrod 20 has moved to its stroke limit. The sensor 67 detects the stroke limit based on change in the intensity of the magnetic force of the magnet 66, which changes between the sensor 67 and the as a function of the distance magnet 66.

The sensor 67 may be an analog output Hall sensor. The analogue signal from the Hall sensor 67 is converted to a digital signal in an A/D converter and entered into an engine control unit, not shown. The digital signal indicates the distance between the sensor and the magnet Thus, it is possible to detect not only the stroke limit of the pushrod but any position of the pushrod by e.g. comparing the input signal with a plurality of thresholds each corresponding to a different position of the pushrod. The detector of this embodiment can thus detect the position of the pushrod near its stroke limit and produce e.g. a warning signal at this stage. This permits earlier replacement or maintenance of the belt.

Figure 11:
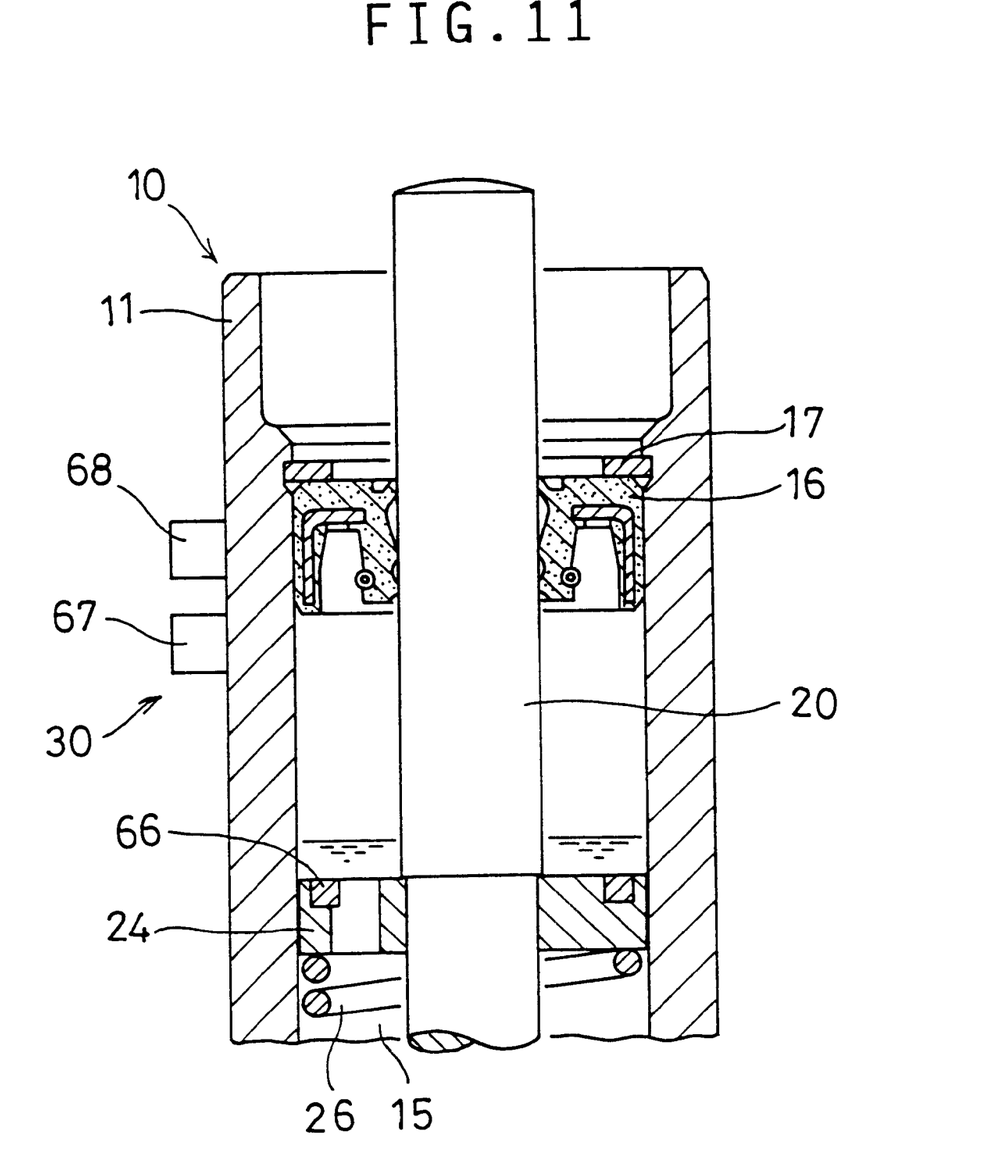
Figure 12:
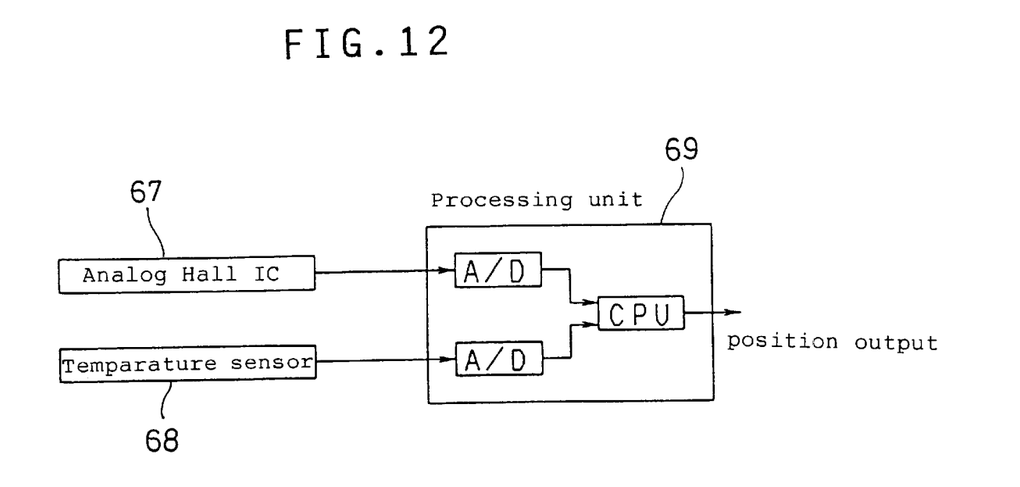
FIG. 12 schematically shows the position detecting circuit of the embodiment of FIG. 11.

The magnetic force of the permanent magnet 66 lowers as the temperature rises. The Hall sensor 67 has a temperature-dependent output offset. Thus, for accurate detection of the position of the pushrod 20, the detector should be provided with a temperature-compensation means as shown in FIGS. 11 and 12 to avoid error caused by temperature change.

This means comprises a temperature sensor 68 mounted on the cylinder 11 near the Hall sensor 67, and a control unit 69 including A/D converters for converting signals from the Hall sensor 67 and the temperature sensor 68 into digital signals, and a CPU programmed to correct the position detection signal from the sensor 67 based on the temperature signal from the temperature sensor 68 to detect the position of the pushrod 20.

Thus, the detector with such a temperature compensation can always detect the position of the pushrod with high accuracy even at high ambient temperature. Instead of the temperature sensor 68, any temperature sensor used in various parts of the vehicle e.g. a water temperature gauge for the radiator may be used.

Figure 13:
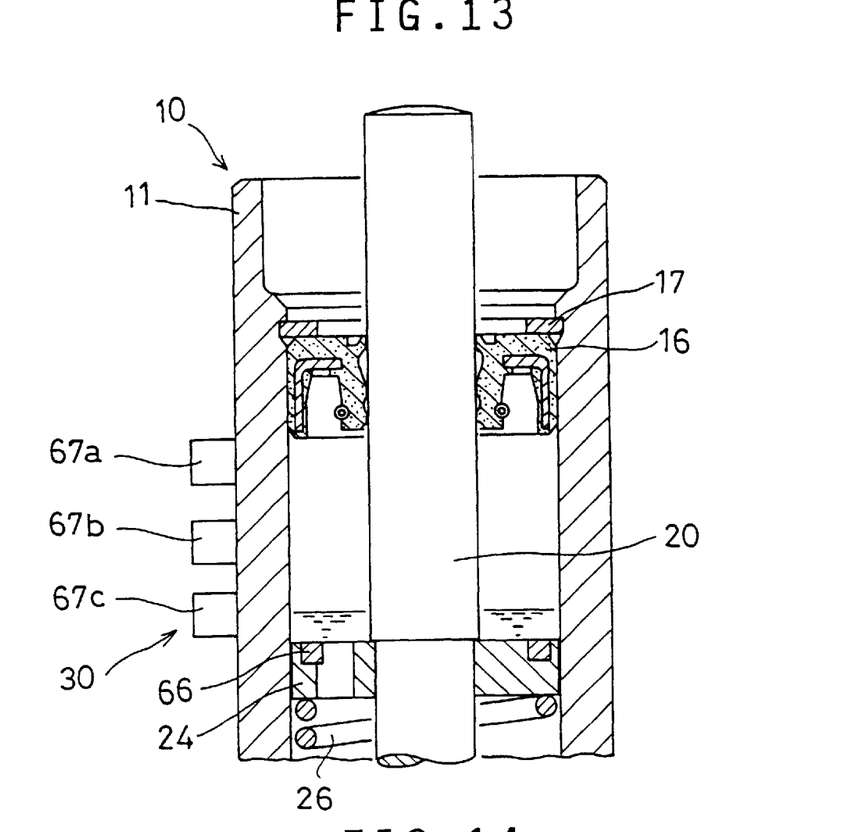
FIG. 13 is a sectional view of an autotensioner of an eighth embodiment.

The detector 30 of FIG. 13 comprises a ring-shaped permanent magnet 66 bonded to the guide flange 24, which is made from a non-magnetizable material in this embodiment, and a sensor 67a mounted on the outer surface of the cylinder 11 at such a position that it radially opposes the magnet 66 when the pushrod 20 has moved to its stroke limit, and a plurality of sensors 67b, 67c mounted on the outer surface of the cylinder 11 under the sensor 67a at such positions that they each radially oppose the magnet 66 when the pushrod 20 is at intermediate positions before its stroke limit The sensors 67a, 67b, 67c are contact-output Hall sensors, which are turned on only when the magnet 66 is close thereto. Thus, by detecting which sensor is on, it is possible to approximately detect the position of the pushrod 20.

Figure 14:
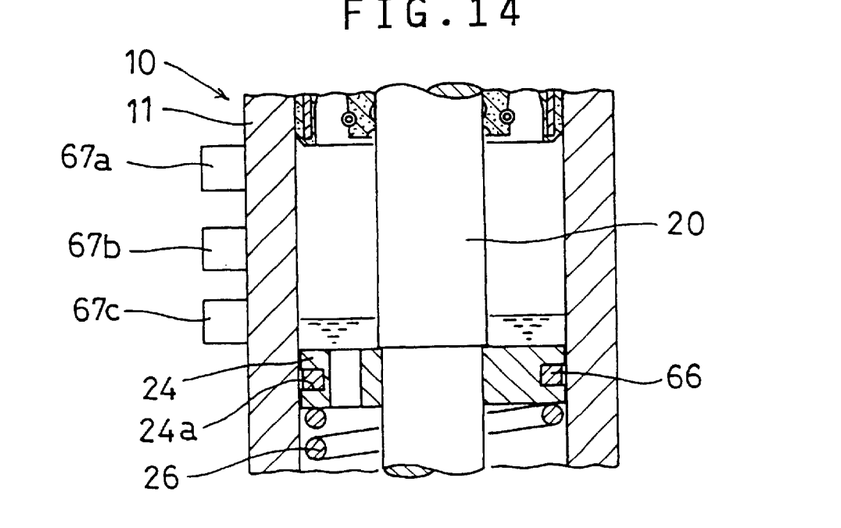
FIG. 14 is a sectional view of a modification of the embodiment of FIG. 13.

In the embodiments of FIGS. 10–13, the permanent magnet 66 is mounted to the top surface of the guide flange 24. But instead, it may comprise two ring halves received in an annular groove 24a (FIG. 14) formed in the radially outer surface of the flange 24. The magnet 66 has an outer diameter smaller than that of the flange 24 to keep it out of contact with the inner wall of the cylinder 11.

Figure 15:
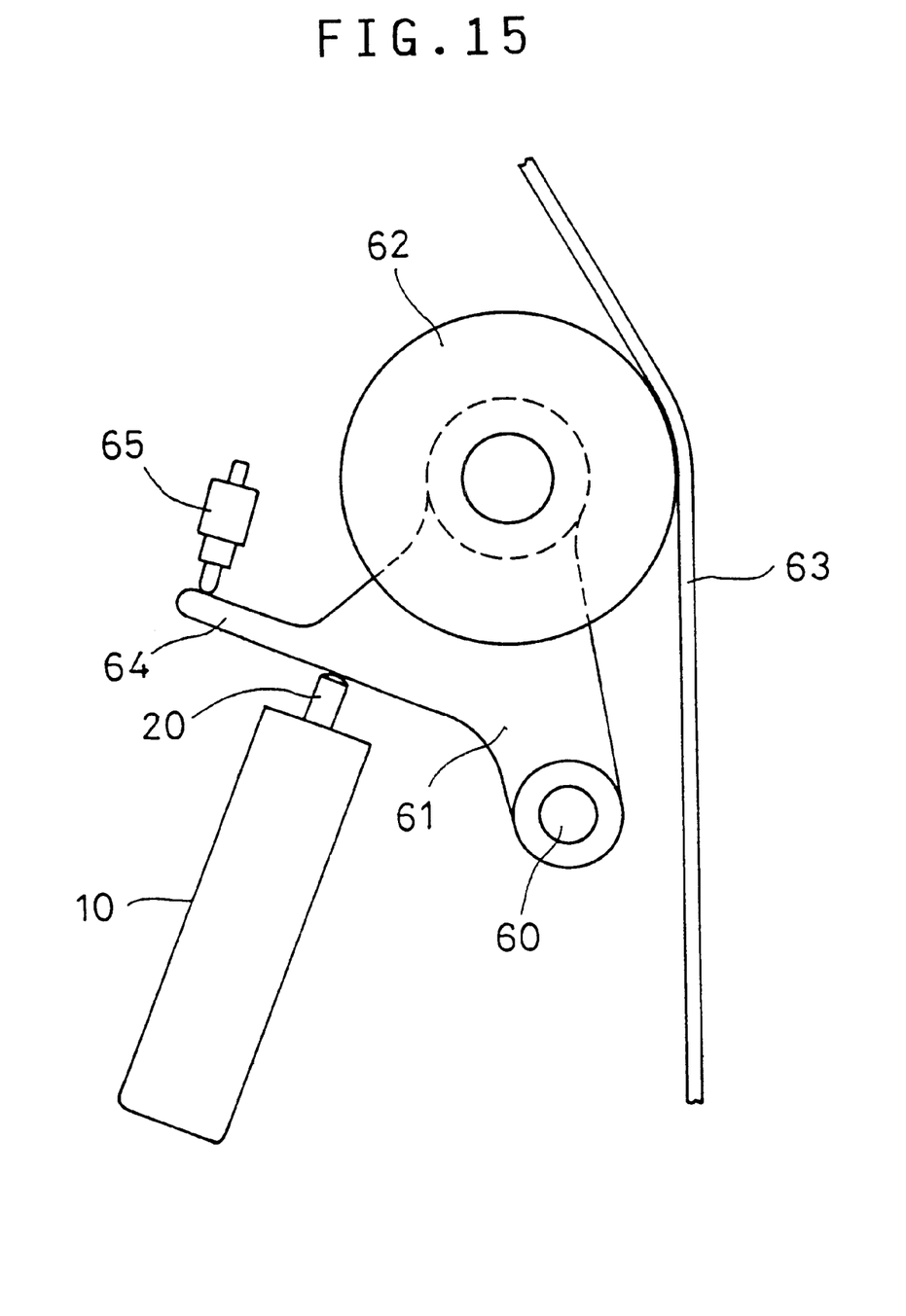
FIG. 15 is a front view of a belt tension adjustor embodying the invention.

FIG. 15 shows a tension adjustor which includes a pulley arm 61 pivotable about a pin 60 and carrying a tension pulley 62 at one free end thereof. A protrusion 64 is formed at another free end thereof. The arm 61 is biased by an autotensioner 10 so as to pivot in such a direction that the pulley 62 is pressed against a timing belt 63.

A switch 65 is provided at such a position that the protrusion 64 abuts and closes the switch 65 when the pushrod 20 of the autotensioner 10 has moved to its stroke limit Thus, it is possible to detect the stroke limit position of the pushrod.

The pushrod 20 of the autotensioner 10 is moved in and out to absorb any change in the tension in the belt 63. In other words, the autotensioner used is of such a type that its pushrod 20 has a stroke limit.

By detecting the stroke limit of the pushrod, it is possible to notify the driver that the autotensioner has lost its function and that it is necessary to replace the timing belt. This improves the safety of the belt transmission.

What is claimed is:

1. An autotensioner comprising a cylinder, a pushrod slidably received in said cylinder, and a spring for biasing said pushrod so as to protrude out of said cylinder, said pushrod being movable in an axial direction to absorb any change in tension in a belt, characterized in that a detector for detecting a limit position of a forward stroke of said pushrod is provided;

wherein said detector comprises an electrode mounted to said cylinder through an insulating member, and a contactor provided on said pushrod so as to come into contact with said electrode when said pushrod has moved to said limit position; and wherein said electrode is a metal ring for reinforcing an oil seal closing an opening of said cylinder, and wherein said contactor is a guide flange fixedly mounted on said pushrod and guided along the inner periphery of said cylinder.

* * * * *